US009351100B2

(12) United States Patent
Tärnhed et al.

(10) Patent No.: US 9,351,100 B2
(45) Date of Patent: May 24, 2016

(54) DEVICE FOR CONTROL OF DATA TRANSFER IN LOCAL AREA NETWORK

(71) Applicant: Sony Corporation, Tokyo (JP)

(72) Inventors: Kristian Tärnhed, Lund (SE); Per Åstrand, Lund (SE); Kåre Agardh, Rydebäck (SE); Thomas Bolin, Lund (SE); Aleksandar Rodzevski, Malmö (SE); Henrik Bengtsson, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/513,672

(22) Filed: Oct. 14, 2014

(65) Prior Publication Data

US 2015/0312704 A1     Oct. 29, 2015

Related U.S. Application Data

(63) Continuation-in-part of application No. 14/318,025, filed on Jun. 27, 2014.

(60) Provisional application No. 61/912,223, filed on Dec. 5, 2013, provisional application No. 61/942,753, filed on Feb. 21, 2014.

(51) Int. Cl.
*H04B 5/00*     (2006.01)
*H04W 4/00*    (2009.01)
(Continued)

(52) U.S. Cl.
CPC ............. *H04W 4/008* (2013.01); *H04B 5/0012* (2013.01); *H04B 13/005* (2013.01); *H04W 84/10* (2013.01); *H04B 5/0031* (2013.01)

(58) Field of Classification Search
CPC ....................................................... H04B 13/005
USPC ......................................................... 455/41.1
See application file for complete search history.

(56) References Cited

U.S. PATENT DOCUMENTS 6,211,799 B1    4/2001   Post et al.
6,580,356 B1    6/2003   Alt et al.
(Continued)

FOREIGN PATENT DOCUMENTS

EP     1024626 A1    8/2000
EP     1102215 A2    5/2001
(Continued)

OTHER PUBLICATIONS

"The Nymi White Paper", Nov. 19, 2013, XP055115588, pp. 3,5,6,14-21.
(Continued)

*Primary Examiner* — Ajibola Akinyemi
(74) *Attorney, Agent, or Firm* — Tucker Ellis LLP

(57) ABSTRACT

The present invention concerns wearable electronic communication devices (100) for control of data transfer in a personal area network. The wearable device is adapted for Body Coupled Communication in close proximity to a person's body. The wearable device comprises an antenna adapted for Body Coupled Communication and a capacitance sensor indicating that the wearable device is in close proximity to the body of the person or even in contact with the body or not. The invention also concerns a portable electronic communication device comprising the inventive wearable device for cooperation with at least a second portable electronic communication device in a personal area network.

10 Claims, 7 Drawing Sheets

(51) Int. Cl.
*H04B 13/00* (2006.01)
*H04W 84/10* (2009.01)

(56) References Cited

U.S. PATENT DOCUMENTS

| | | | |
|---|---|---|---|
| 7,202,773 B1 | 4/2007 | Oba et al. | |
| 8,253,693 B2 * | 8/2012 | Buil | H04B 13/005 345/1.1 |
| 8,867,995 B2 * | 10/2014 | Kim | H04B 13/005 345/163 |
| 2002/0128030 A1 | 9/2002 | Eiden et al. | |
| 2004/0203381 A1 | 10/2004 | Cahn et al. | |
| 2004/0248513 A1 | 12/2004 | Glass et al. | |
| 2005/0008148 A1 | 1/2005 | Jacobson | |
| 2005/0243061 A1 | 11/2005 | Liberty et al. | |
| 2006/0109135 A1 | 5/2006 | Donat et al. | |
| 2006/0258408 A1 | 11/2006 | Tuomela et al. | |
| 2007/0145119 A1 | 6/2007 | Rhelimi | |
| 2007/0190940 A1 | 8/2007 | Lee et al. | |
| 2007/0282783 A1 | 12/2007 | Singh | |
| 2008/0259043 A1 | 10/2008 | Buil et al. | |
| 2009/0094681 A1 | 4/2009 | Sadler et al. | |
| 2009/0233548 A1 | 9/2009 | Andersson et al. | |
| 2010/0003917 A1 | 1/2010 | Hebiguchi et al. | |
| 2010/0113950 A1 | 5/2010 | Lin et al. | |
| 2010/0263031 A1 | 10/2010 | Tsuchiya | |
| 2010/0277435 A1 | 11/2010 | Han et al. | |
| 2010/0311326 A1 | 12/2010 | Klabunde et al. | |
| 2010/0312071 A1 | 12/2010 | Schenk | |
| 2011/0205156 A1 | 8/2011 | Gomez et al. | |
| 2012/0026129 A1 | 2/2012 | Kawakami | |
| 2012/0133605 A1 | 5/2012 | Tanaka | |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0174049 A1 | 7/2013 | Townsend et al. | |
| 2014/0085050 A1 | 3/2014 | Luna | |
| 2014/0325614 A1 | 10/2014 | Rhelimi | |

FOREIGN PATENT DOCUMENTS

| | | |
|---|---|---|
| EP | 1220501 A2 | 7/2002 |
| EP | 2018038 A2 | 1/2009 |
| EP | 2378748 A1 | 10/2011 |
| EP | 2600319 A1 | 6/2013 |
| JP | 2007073462 A | 4/2008 |
| JP | 2009049951 A | 3/2009 |
| WO | 2007096810 A1 | 8/2007 |
| WO | 2007129237 A1 | 11/2007 |
| WO | 2011021531 A1 | 2/2011 |

OTHER PUBLICATIONS

Bionym Inc.: "Nymi by Bionym" Sep. 2, 2013, YouTube Video retrieved from the Internet May 7, 2014 at URL: https://www.youtube.com/watch?v=jUO7Qnmc8vE#t=37.

PCT International Search Report and Written Opinion issued for corresponding international application No. PCT/IB2014/066627 mailed Apr. 20, 2015, 12 pages.

Zimmerman, "Personal Area Networks: Near-Field intrabody communication," XP 000635090 IBM Systems Journal, vol. 35, Nos. 3&4, 1996, pp. 609-617.

W. Knight, "Human Handshake Opens Data Stream," NewScientist.com, Oct. 7, 2002 http://www.newscientist.com/article/dn2891-human-handshake-opens-data-stream.html.

W. Knight, "Skin Used to Transmit Key Data," NewScientist.com, Aug. 5, 2004, http://www.newscientist.com/article/dn6247-skin-used-to-transmit-key-data.html.

* cited by examiner

DEVICE FOR CONTROL OF DATA TRANSFER IN LOCAL AREA NETWORK

CROSS-REFERENCE TO RELATED APPLICATIONS

This application is a continuation-in-part of U.S. patent application Ser. No. 14/318,025, filed 27 Jun. 2014, the disclosure of which is hereby incorporated by reference herein.

TECHNICAL FIELD

The present invention relates to portable and wearable electronic communication devices and hardware assembly devices used in such wearable electronic communication devices for data transfer and control of said data transfer close to and/or in contact with a person's body, wherein the inventive device is a wearable electronic communication device adapted for both wireless and Body Coupled Communication with at least one further portable electronic communication device of a system in a personal area network.

BACKGROUND ART

Earpieces, earphones, headsets, headphones or other handsfree solutions are commonly utilized to keep the sound private and/or to facilitate multitasking when listening to music, talking in the phone, getting body function updates from your wristlet etc. Due to the rapid development of new electronic devices, e.g. mp3 players, tablets, smart phones, wearables, etc., where the sound experience plays an important role, the technique for transmittal of sound to the earpieces has undergone major improvements.

Conventional headphones or earpieces are generally wired to audio devices. However, for some time, wires can be avoided by utilizing different kinds of short range wireless solutions, also referred to as Personal Area Network (PAN) solutions. Examples are; Bluetooth® (BT), Infrared Data Association (IrDA), ZigBee®, Ultra Wide Band (UWB), etc. The radio-frequency (RF) techniques have some drawbacks, e.g. there might be a limited operating time due to relatively high power consumption of the RF transceiver, there is a risk of interference with other RF systems operating in the same frequency band.

Even though the above-mentioned known devices and methods of controlling data transfer between such devices, by wire or wirelessly, are relatively straight-forward for a user of such devices and wearables, such as mobile telephones, headphones, headsets, microphones, speakers and/or wristlets, there is an increasing demand in the mobile device market for even more easy, quick and user-friendly ways of using a mobile phone or other portable electronic device and wearable communication devices, e.g. headsets.

In particular, with regard to audio and voice communication, there is a need to simplify the user interaction with mobile phones and any headphones, and there is a need for faster, easier and more intuitive ways of controlling the communication between such devices by means of easy and convenient methods and autonomous hardware.

Furthermore, there is an increasing demand on reduced size of portable and wearable devices for communication, specifically the foot print areas as displays are getting bigger while the device in itself is getting thinner. Hence, in many cases, the available volume and envelope surfaces of housings for such wearable devices are getting smaller, or at least the height or thickness of a new model of such a device is often reduced, meaning that overall heights and sizes and foot print areas of associated hardware, e.g. antennas, sensors, and integrated circuits, inside the wearable devices undergo delicate optimizations of available space as more and more hardware components often are to be introduced in such a device. Hence, there is a need of a reliable and simple portable electronic communication device that has an optimized/minimized overall size and envelope surface size and foot-print area. This is also due to the fact that the size of portable and wearable electronic communication devices, i.e. at least their height or thickness in z-axis, must be as small as possible as the thicknesses of such electronic devices decreases constantly, whereby the available height for hardware inside such devices decreases and also allows only a certain minimum height available for clearance and/or room for the thickness and heat dissipation of the associated active circuitry of the hardware inside such a device. The surface area of the hardware inside the housing of a wearable electronic communication device and the housing itself also involves an increased cost for the manufacturer of the device as any additional volume or area of the device in general demand more effort and material at manufacture. Yet further, when a wearable electronic device is to be equipped with additional hardware, such as BAN/BCC antennas and capacitive sensors, the handling and size of the portable electronic device are compromised as known hardware, due to their shape, require a certain minimum height and foot-print area inside such a device, but also externally of the device, i.e. the outer envelope surface is also affected by the above delicate considerations of dimensions.

SUMMARY OF THE INVENTION

With the above description in mind, then, an aspect of the present invention is to provide a wearable electronic communication device comprising a device in the form of a hardware assembly, for control of data transfer between wearable mobile electronic communication devices that can be used in close proximity to a body of a user, and/or in partial or entire/full contact with the user's body, which seek to mitigate, alleviate, or eliminate one or more of the above-identified deficiencies in the art and disadvantages singly or in any combination.

These and further objects are achieved by a device in the form of a hardware assembly and a mobile/wearable device comprising such a hardware assembly device, which devices are adapted to cooperate in and with a system and a local/personal/body area network for controlling data transfer between these inventive wearable devices and at least one, two, three or more portable electronic communication devices. The hardware assembly device and mobile/wearable device according to the invention comprises at least one sensor and/or electrode and/or antenna being adapted for both Body-Coupled/-Based Communication (BCC/BBC) and short-range wireless communication by having a capacity to both detect if the mobile/wearable device is on a body of an user and to receive and transmit BCC/BBC signals as one physical entity common for both functions.

These and further objects are achieved by a device in the form of a hardware assembly, a wearable electronic communication device comprising the hardware assembly device and a first portable electronic communication device according to the invention being arranged for cooperating with at least a second portable electronic communication device via BCC and short-range wireless communication. The two former and inventive devices are configured to be in close proximity to a person's body during use.

According to one aspect of the disclosure, it provides a wearable electronic communication device for a portable electronic communication device, wherein the wearable electronic communication device is adapted for Body Coupled Communication (BCC) and capacitance measurement in close proximity to a person's body, and comprises an antenna adapted for the BCC; a sensor adapted for detecting if a capacitance belongs to a predefined capacitance interval or range indicating that the wearable device is in close proximity to the head or other body part of the person or even in contact with the body or not, and processing circuitry in operational connection with the antenna and the sensor for control of the BCC and capacitance measurement, wherein the antenna and the capacitance sensor are one and the same entity adapted to be utilized as one common electrode for both the BCC and the body capacitance measurement of the wearable device, whereby the body capacitance measurement and the BCC are accomplished by means of processing circuitry comprising differing impedances when using the common electrode for body capacitance measurement and when using the common electrode for BCC.

According to a further aspect of the disclosure, it provides a wearable electronic communication device comprising first and second processing circuitry operationally coupled to the common antenna and capacitance sensor, which first processing circuitry is configured to perform/control the capacitance measurement and to present a higher impedance than the impedance of the second processing circuitry configured to perform/control the BCC.

According to yet another aspect of the disclosure, it provides a wearable electronic communication device, wherein the second processing circuitry comprises a band-pass filter operationally arranged as an input of this second processing circuitry to filter out any interfering noise originating from signals of the common antenna and capacitance sensor as a result of the capacitance measurement.

According to still another aspect of the disclosure, it provides a wearable electronic communication device, wherein the second processing circuitry comprises a high pass filter operationally arranged as an input of this second processing circuitry to filter out any interfering noise originating from signals of the common antenna and capacitance sensor as a result of the capacitance measurement.

According to a further aspect of the disclosure, it provides a wearable electronic communication device, wherein the first processing circuitry comprises a resistor operationally arranged as an input of this first processing circuitry to increase the impedance of the first processing circuitry.

According to yet another aspect of the disclosure, it provides a wearable electronic communication device, wherein the first processing circuitry comprises a low pass filter operationally arranged as an input of this first processing circuitry to increase the impedance of the first processing circuitry.

According to still another aspect of the disclosure, it provides a wearable electronic communication device, wherein the processing circuitry comprises sub-circuitry operationally adapted to tune or match the impedance of the processing circuitry resulting from when the common antenna and capacitance sensor is in close proximity to or in contact with the body of the person or not to match both the receiving and transmitting impedances of the processing circuitry simultaneously.

According to one aspect of the disclosure, it provides a portable electronic communication device comprising such a wearable device, wherein the processing circuitry comprises sub-circuitry operationally adapted to control/perform BCC via the common antenna and capacitance sensor when the common antenna and capacitance sensor is in close proximity to or in contact with the body of the person, the sub-circuitry comprising a transmitter and a receiver. The transmitter and receiver are adapted for BCC and/or RF communication.

According to still another aspect of the disclosure, it provides a wearable electronic communication device, wherein the second processing circuitry comprises sub-circuitry operationally adapted to tune or match the impedance of the second processing circuitry resulting from when the common antenna and capacitance sensor is in close proximity to or in contact with the body of the person or not to match both the receiving and transmitting impedances of the second processing circuitry simultaneously.

According to one aspect of the disclosure, it provides a portable electronic communication device comprising such a wearable device, wherein the second processing circuitry comprises sub-circuitry operationally adapted to control/perform BCC via the common antenna and capacitance sensor when the common antenna and capacitance sensor is in close proximity to or in contact with the body of the person, the sub-circuitry comprising a transmitter and a receiver. The transmitter and receiver are adapted for BCC and/or RF communication.

According to one aspect of the disclosure, it provides a portable electronic communication device comprising such a wearable device, which portable electronic communication device is adapted for Body Coupled Communication (BCC) and short-range wireless RF communication, the portable electronic communication device being configured to be in close proximity to or in contact with a person's body during use and comprises a controller configured to control both autonomous and external and internal operation of the portable electronic communication device and the BCC wireless communication and the short-range wireless RF communication from and to the portable electronic communication device, wherein the portable electronic communication device comprises a wearable electronic communication device according to any of the above aspects, and that the controller is operationally connected to the wearable electronic communication device.

According to another aspect of the disclosure, it provides a portable electronic communication device, wherein the wearable and/or portable electronic communication device is a headphone, headset, wristlet, necklace, ring on a finger, ankle band, visors or goggles or a combination of such wearables.

The advantages of the above invention and aspects are for example the following. One advantage is that the wearable electronic communication device and the inventive device in the form of a hardware assembly with an antenna and electrode in one common entity or hardware for both BCC and capacitance check makes the wearable device smaller. Another advantage is that the wearable electronic communication device and the inventive device in the form of a hardware assembly with an antenna and electrode in one common entity or hardware for both BCC and capacitance check makes more space in the interior of the wearable device. This increased inner space is available for further hardware or use without increasing its size, i.e. without increasing the dimensions and/or envelope surface and/or footprint area of the wearable device. Furthermore, the power required for enabling and operating the hardware assembly device and the wearable device according to the invention is also negligible or low. The invention also enables to detect when the wearable device, e.g. a tablet/smartphone/wristlet and/or headset/visors are on the same body by means of one and the same antenna and electrode, no separate antenna or electrode is necessary for this. The inventive devices reduce the number of components and simplify associated circuitry when built and used. The inventive hardware assembly device reduces costs for implementation of such systems in wearable electronic communication devices. The necessary space for existing hardware is also reduced by the inventive device enabling improved cooling. The necessary space for existing hardware is also reduced by the inventive device making room for additional components without increasing the size of the electronic wearable device. The inventive device with the body capacitance measurement and the BCC implemented by means of one and the same component and by means of processing circuitry comprising differing impedances when using the common electrode for body capacitance measurement and when using the common electrode for BCC means that processing circuitry for the BCC are not negatively affected or loaded by power dissipation due to the capacitance measurement. Furthermore, RF techniques exhibit by nature radiation patterns which field-strengths can vary largely in different directions from its source and which relates to device and antenna configurations as well as shadowing and absorption effects present in the close vicinity to the RF source. In some applications, it is however important to be able to control and limit the radiating field outside of the users body to less than a few cm range and hence the BCC/BAN technique of the invention greatly can serve this purpose.

Further objects and features of the present invention will appear from the following detailed description of aspects of the invention.

BRIEF DESCRIPTION OF THE DRAWINGS

The present technique will be more readily understood through the study of the following detailed description of the embodiments/aspects together with the accompanying drawings, of which.

Figures 1, 2:
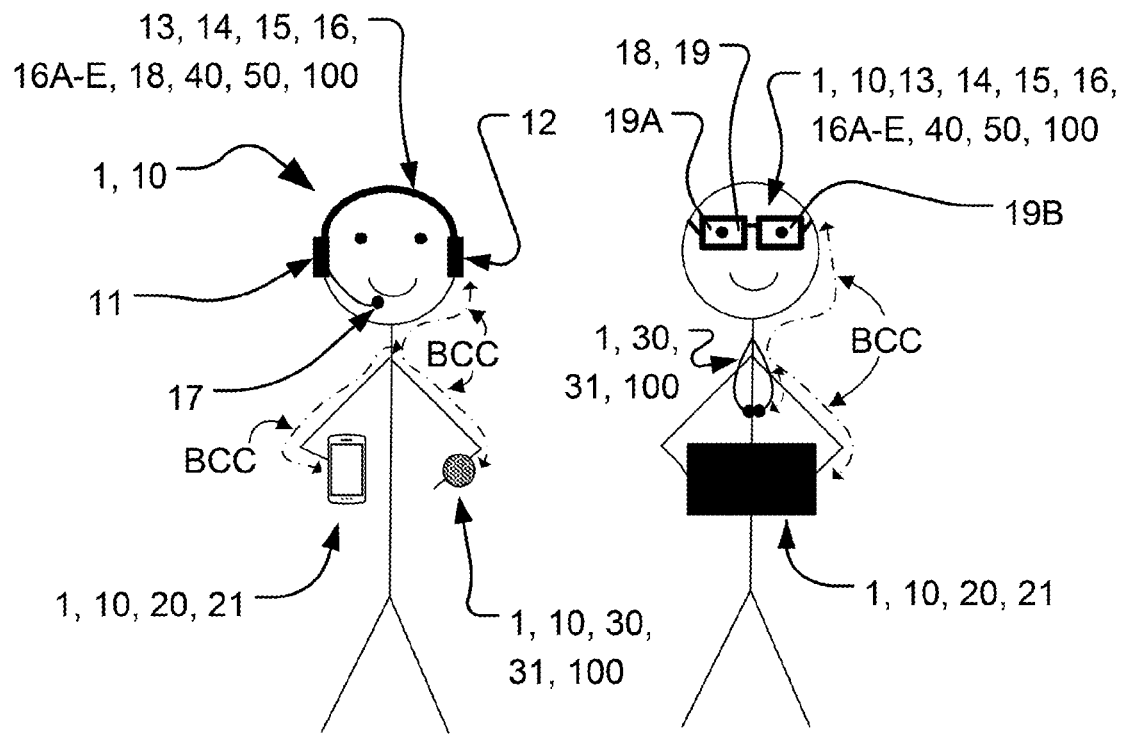
FIG. 1 illustrates a user wearing at least two portable electronic communication devices in one scenario of how the present invention can be implemented.
FIG. 2 illustrates another user wearing at least two portable electronic communication devices in another scenario of how the present invention can be implemented.

It should be added that the following description of the aspects/embodiments is for illustration purposes only and should not be interpreted as limiting the disclosure exclusively to these embodiments/aspects. For example, a user may wear and/or hold at least three different wearable and/or portable devices during use, such as headphones and wristlet as in FIG. 1 in combination with goggles and/or necklace as in FIG. 2 while at the same time holding a mobile phone and/or media plate during use.

DETAILED DESCRIPTION

Various aspects of the invention will hereinafter be described in conjunction with the appended drawings to illustrate but not to limit the invention. Variations of the inventive aspects are not restricted to the specifically shown embodiments, but are applicable on other variations of the invention. Like designations denote like elements.

Embodiments of the present invention will be exemplified using a mobile communication device such as a mobile phone and/or a wearable device such as a wristlet, headphone or visors or the like. However, it should be appreciated that the invention is as such equally applicable to electronic devices which have touch detection capabilities. Examples of such devices may for instance be any type of mobile phone, smartphone, laptop (such as standard, ultra-portables, netbooks, and micro laptops) handheld computers, portable digital assistants, tablet computers, touch pads, gaming devices, accessories to mobile phones, e.g. wearables in the form of headphones/-sets, visors/goggles, bracelets, wrist-/ankle bands, necklaces, earrings, eardrops, earclips, rings etc. For the sake of clarity and simplicity, the embodiments outlined in this specification are exemplified with, and related to, mobile phones, tablets, headphones and head, neck, arm and finger wearables only.

FIGS. 1, 2, 3, 4, 5, 6, and 6A to 6D illustrate examples of wearable and portable electronic communication devices 1, 10, 20, 30 operating in systems for data transfer in a local/body area network. The electronic device 1, 10, 20, 30 comprises a central handling and processing unit 40 that may be constituted by any suitable Central Processing Unit (CPU), microcontroller, Digital Signal Processor (DSP), etc., capable of executing computer program code for evaluating and comparing signals for operation of the electronic device. The electronic device 1, 10, 20, 30 further comprises a memory 50 that can be used for storing computer program code, old/predefined values, e.g. capacitance values, and threshold values, e.g. threshold capacitance values etc. The memory 50 can be any combination of a Read and write Memory (RAM), and a Read Only Memory (ROM). The memory 50 may also comprise persistent storage, which, for example, can be any single one or combination of magnetic memory, optical memory, or solid state memory or even remotely mounted memory. The electronic device 1 also comprises components required for its operation, such as power supplying batteries (not shown), but these components are not explained further as this is common knowledge for a skilled person. The memory 50 itself is stored and arranged in or on the first wearable and portable electronic communication device 1, 10 itself.

FIGS. 1 and 2 show schematic overviews of examples of wearable and portable electronic communication devices 1 in the form of a headphone/-set and/or visors/goggles and/or necklace and/or wristlet 10, 20, 30 being an implementation of the invention and put on a head and/or arm and/or wrist and/or around a neck of a user for operation.

The wearable and portable electronic communication device 10 according to the invention comprises an inventive special hardware assembly device 100 and will be explained in more detail below. In this example, the visors/goggles 10 of FIG. 2 are equipped with at least one display 19, 19A, 19B. The visors may be provided with at least one microphone 17 and/or at least one speaker 11, 12 similar to the headset of FIG. 1, even though the microphone and speakers are not shown in FIG. 2, the visors may be a combined audio and video handling portable device.

Figure 5:
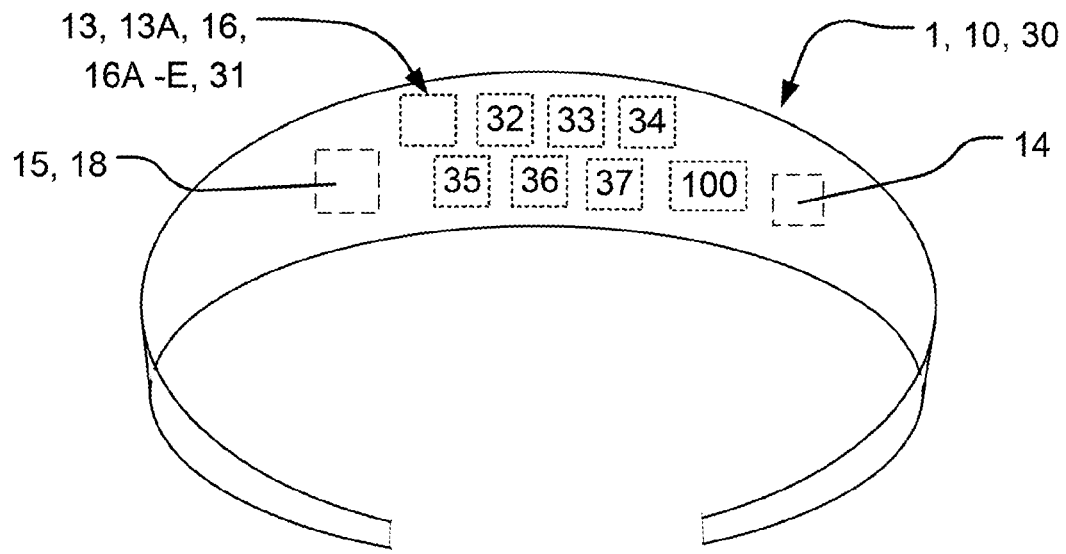
FIG. 5 illustrates yet another example of a wearable/portable mobile electronic communication device embodying a third implementation of the invention.

In FIG. 1, there is also schematically shown an example of a third wearable/portable electronic communication device 1, in addition to the two electronic communication devices 1, 10, 20, in the form of a bracelet, the necklace and/or wristband 30, which is shown in more detail in FIG. 5. The user could of course wear or hold more than three devices totally as long as one of them comprises the inventive hardware assembly device 100. These at least three devices may be a headset or visors 10, a wristband 30, a necklace 30, chest band and/or an earring, a ring on a finger, and/or a band around an ankle (not depicted) and a smart phone or tablet 20.

The first portable communication device 10 may be a headphone, headset, visors or goggles or a combination of such wearables, e.g. a headset 10 with one or more spectacles working as displays 19, 19A, 19B, or goggles/visors 10 with a microphone 17 and/or speakers 11, 12.

The inventors have realised that Body-Based/-coupled Communication (BBC/BCC) can be utilized to determine if a first head, ankle, ear, arm, hand and/or wrist wearable communication device 10 and another portable electrical communication device 20, 30, which the user holds in her/his hand and/or in her/his lap and/or wears around the neck and/or arm/wrist, that are to be connected in order to establish an audio and/or video communication, belongs and are in close proximity to/in contact with the same user. The wearable device 10, e.g. headphones and/or wristlet and/or necklace, utilizes BCC to conclude, by itself/themselves, if the other electrical device/-s 20, 30, e.g. the mobile phone and/or tablet and/or visors, is in contact with the same human body as the headphones are. The devices 10, 20, 30 may all be equipped with one or more inventive hardware device assemblies 100 comprising antennas 13, 13A, 21, 31 adapted for BCC.

Hence, the invention concerns a wearable electronic communication device 100 for a portable electronic communication device 10, 20, 30. The wearable electronic communication device 100 is adapted for BCC and capacitance measurement in close proximity to a person's body. The wearable electronic communication device 100 comprises at least one antenna 13 adapted for the BCC (see FIGS. 6, 6A and 6B). The wearable electronic communication device 100 comprises at least one sensor 13 adapted for detecting if a capacitance belongs to a predefined capacitance interval or range indicating that the device 100 is in close proximity to the head or other body part of the person or even in contact with the body or not. The wearable electronic communication device 100 comprises processing circuitry 16, 16A, 16B in operational connection with the antenna and the sensor for control of BCC and capacitance measurement. The antenna 13, 21, 31 and the capacitance sensor 13, 21, 31 are one and the same entity. The antenna 13, 21, 31 and the capacitance sensor 13, 21, 31 are adapted to be utilized as one common electrode for both BCC and body capacitance measurement of the wearable device 100. The body capacitance measurement and the BCC are accomplished by means of the processing circuitry 16, 16A, 16B comprising differing impedances when using the common electrode for body capacitance measurement and when using the common electrode for BCC.

Figure 6:
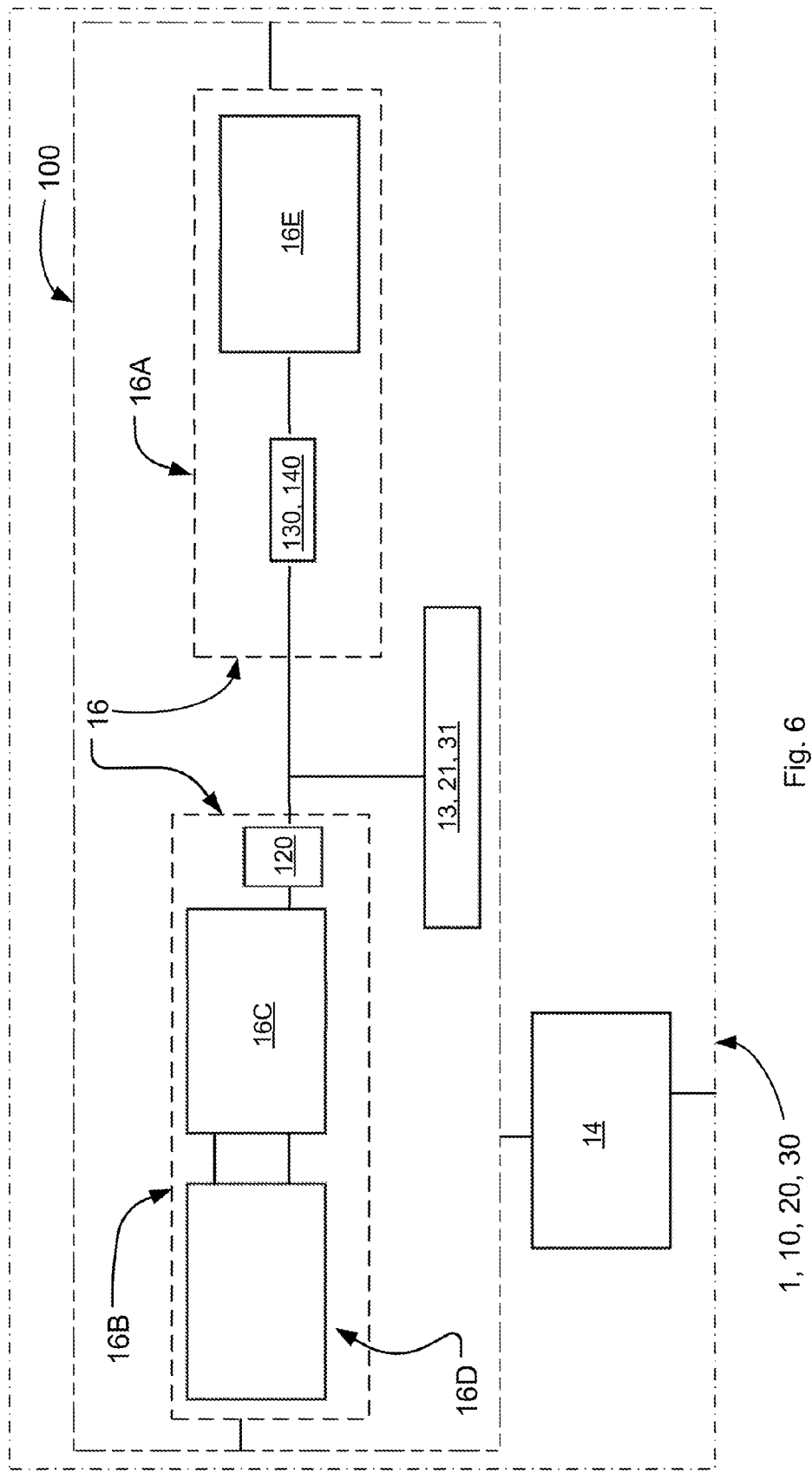
FIG. 6 illustrates a wearable device in the form of a hardware assembly according to the invention comprising a common electrode and antenna for both BCC and capacitance detection adapted for implementation in a portable electronic communication device.
Figure 6A:
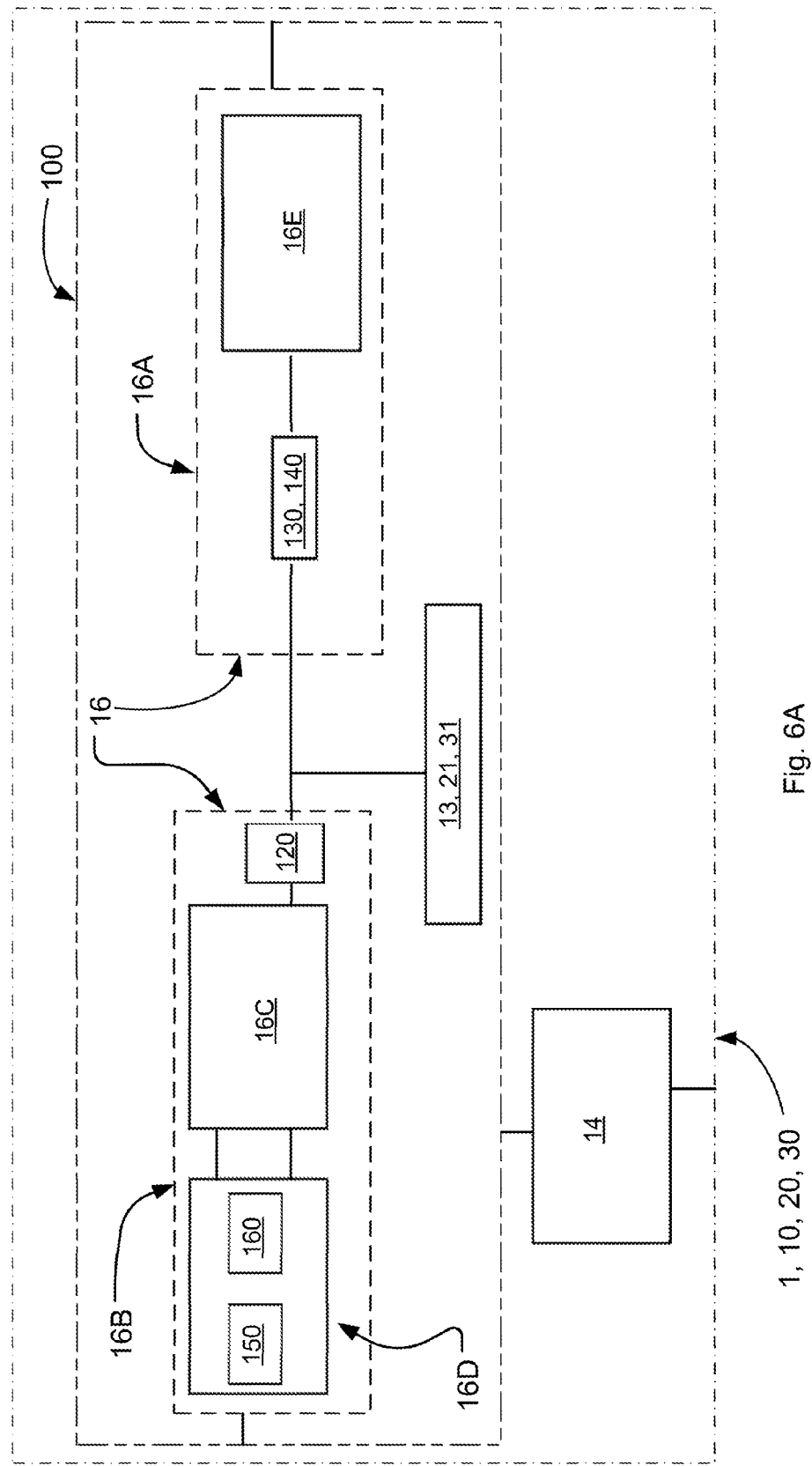
FIG. 6A illustrates a wearable device in the form of a hardware assembly according to the invention of FIG. 6 comprising the common electrode and antenna for both BCC and capacitance detection adapted for implementation in a portable electronic communication device.
Figure 6B:
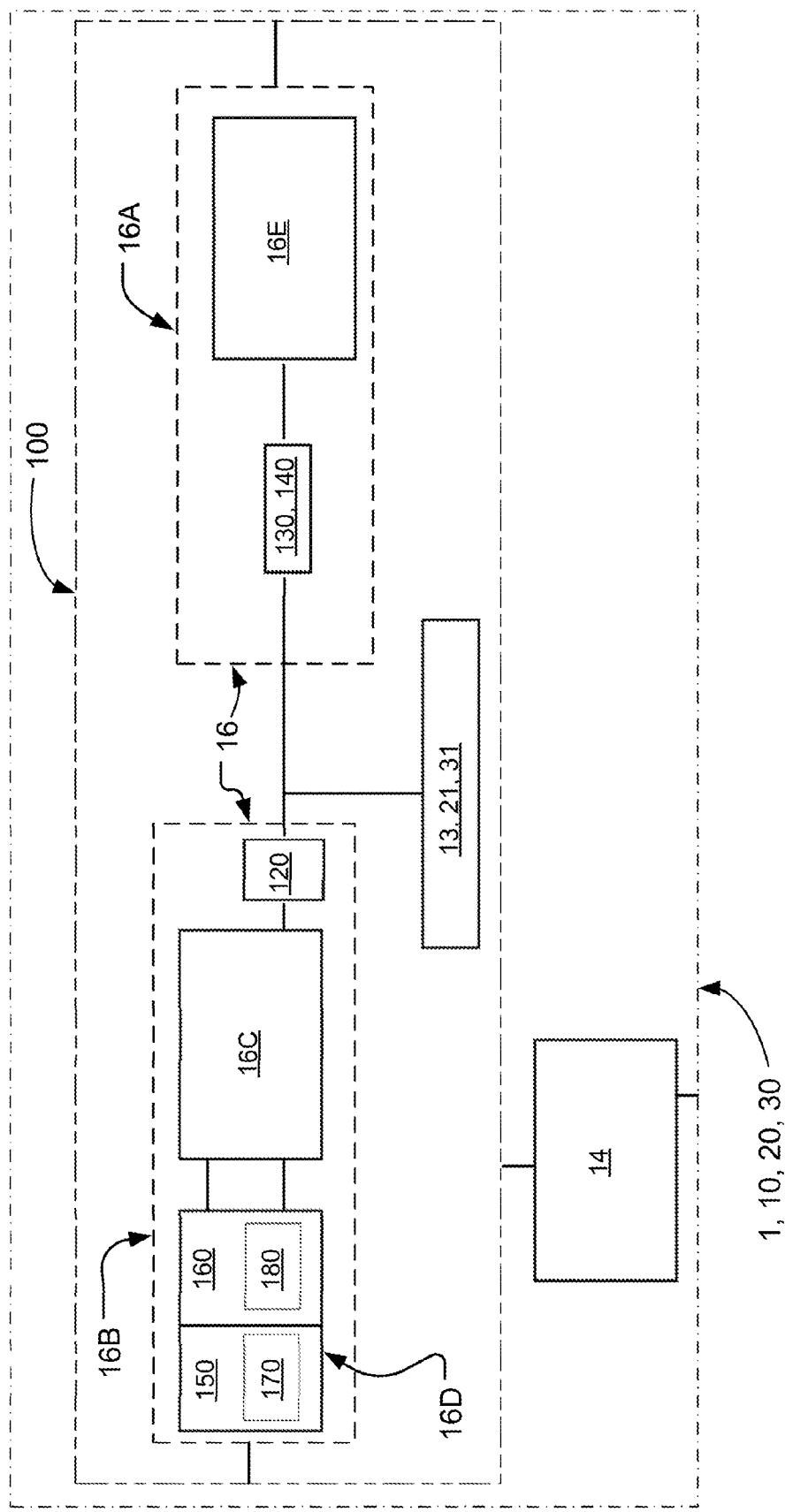
FIG. 6B illustrates a wearable device in the form of a hardware assembly according to the invention of FIGS. 6 and 6A comprising the common electrode and antenna for both BCC and capacitance detection adapted for implementation in a portable electronic communication device.

The wearable electronic communication device 100 comprises first and second processing circuitry 16A and 16B operationally coupled to the common antenna and capacitance sensor 13 (see FIGS. 6, 6A and 6B). The first processing circuitry 16A is configured to perform and/or control the capacitance measurement. The first processing circuitry 16A presents higher impedance than the impedance of the second processing circuitry 16B configured to perform and/or control the BCC.

Figure 6C:
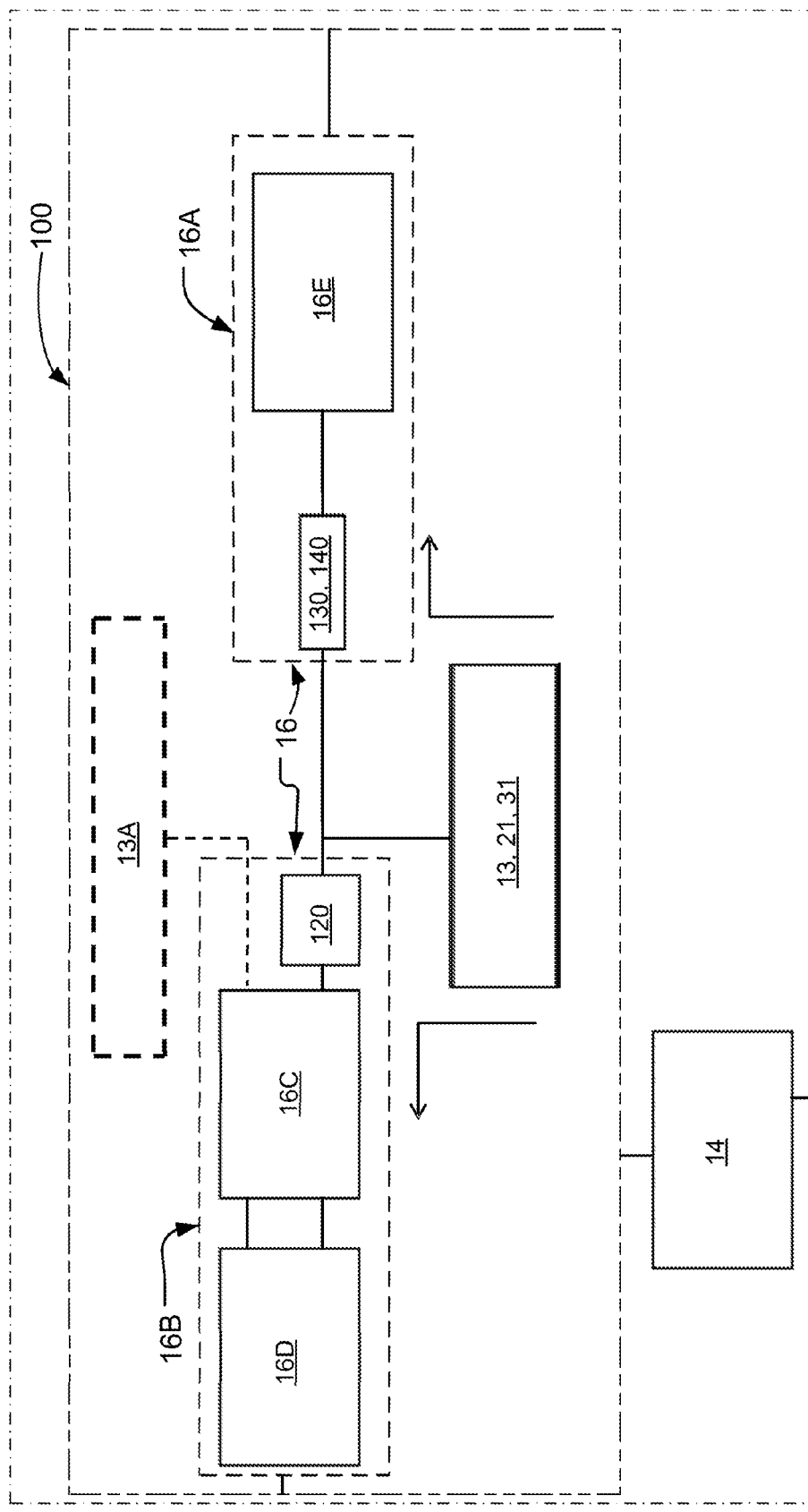
FIG. 6C illustrates yet another example of the wearable device and hardware assembly according to FIGS. 6, 6A and 6B comprising the common electrode and antenna for both BCC and capacitance detection and an optional and additional electrode and/or antenna adapted for implementation in a portable electronic communication device, and a graphical representation in the form of arrows for showing differing impedance loadings of processing circuitries of the wearable device according to the invention.
Figure 6D:
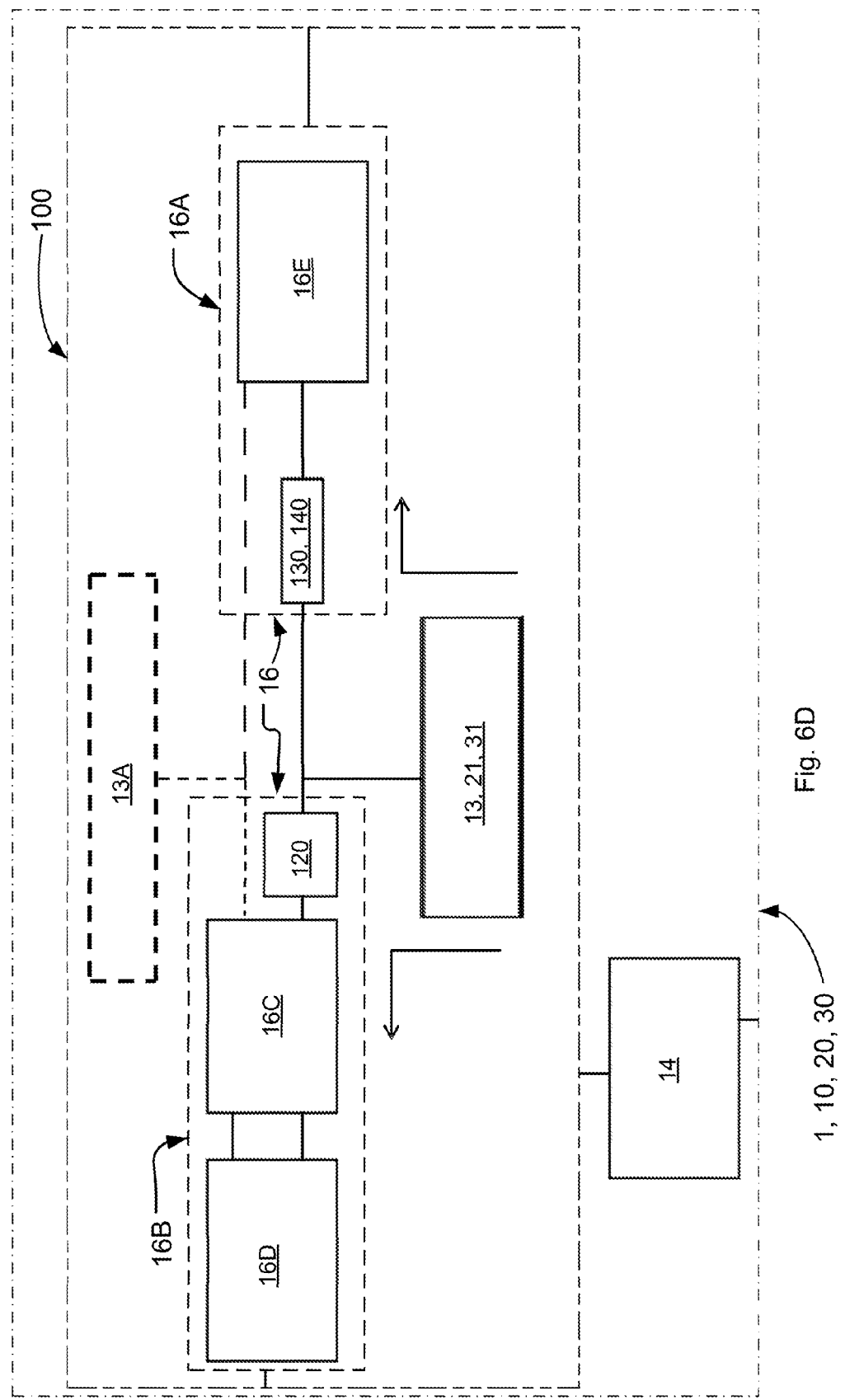
FIG. 6D illustrates another example of the wearable device and hardware assembly according to FIGS. 6, 6A, 6B and 6C comprising at least two common electrodes and antennas for both BCC and capacitance detection adapted for implementation in a portable electronic communication device, and a graphical representation in the form of arrows for showing differing impedance loadings of processing circuitries of the wearable device according to the invention.

FIGS. 6C and 6D illustrate the wearable device 10, 20, 30 and hardware assembly device 100 with a graphical representation in the form of arrows for showing differing impedance loadings of the processing circuitries 16A and 16B according to the invention. An arrow to the left in FIGS. 6C and 6D extends straight vertically from the common electrode 13, 21, 31 and turns left towards the second circuit 16B, i.e. the BCC circuit, and represents lower impedance loading at the BCC "side", i.e. low impedance loading at 5 to 50 MHz and high impedance loading at low frequencies, for the second processing circuitry 16B to the left in FIGS. 6C and 6D. An arrow to the right in FIGS. 6C and 6D extends straight vertically from the common electrode 13, 21, 31 and turns right towards the first circuit 16A, i.e. the capacitance measurement circuit, and represents higher impedance loading at the capacitive measuring "side", i.e. "kHz range" pulse train at high impedance loading for the first processing circuitry 16A to the right in FIG. 6C.

The second processing circuitry 16B of the wearable electronic communication device 100 may comprise a band-pass filter 120 operationally arranged as an input of this second processing circuitry 16B. This band-pass filter 120 is configured to filter out any interfering noise originating from signals of the common antenna and capacitance sensor 13, 21, 31 as a result of and/or in response to the capacitance measurement of the wearable communication device 100.

The second processing circuitry 16B of the wearable electronic communication device 100 may comprise a high pass filter 120 operationally arranged as an input of this second processing circuitry 16B. This high pass filter 120 is configured to filter out any interfering noise originating from signals of the common antenna and capacitance sensor 13, 21, 31 as a result of and/or in response to the capacitance measurement by means of the first processing circuitry 16A of the wearable communication device 100.

The first processing circuitry 16A of the wearable electronic communication device 100 may comprise a resistor 130 operationally arranged as an input of this first processing circuitry 16A to increase the impedance of the first processing circuitry 16A.

The first processing circuitry 16A of the wearable electronic communication device 100 may comprise a low pass filter 140 operationally arranged as an input of this first processing circuitry 16A to increase the impedance of the first processing circuitry 16A.

The second processing circuitry 16B of the wearable electronic communication device 100 may comprise sub-circuitry 16C being an impedance matching or tuning processing circuitry. The sub-circuitry 16C may be operationally adapted to tune the impedance of the second processing circuitry 16B resulting from when the common antenna and capacitance sensor 13, 21, 31 is in close proximity to or in contact with the body of the person or not to satisfy both the receiving and transmitting impedances of the second processing circuitry 16B simultaneously.

The first processing circuitry 16A of the wearable electronic communication device 100 may comprise sub-circuitry similar to the sub-circuitry 16C of the second processing circuitry 16B being an impedance matching processing circuitry. Such a sub-circuitry of the first processing circuitry 16A may also be operationally adapted to tune the impedance of the first processing circuitry 16A resulting from when the common antenna and capacitance sensor 13, 21, 31 in the same way as for the second processing circuitry 16B.

The second processing circuitry 16B of the wearable electronic communication device 100 may comprise BCC communication sub-circuitry 16D operationally adapted to control/perform BCC via the common antenna and capacitance sensor 13, 21, 31 when the common antenna and capacitance sensor is in close proximity to or in contact with the body of the person. The BCC sub-circuitry 16D may comprise a radio transmitter 150 and a receiver 160. The radio transmitter 150 and the receiver 160 may comprise a modulator 170 and demodulator 180, respectively, or other components with equivalent functionality.

The invention concerns a portable electronic communication device 10, 20, 30 being adapted for BCC and short-range wireless RF communication. The portable electronic communication device is configured to be in close proximity to or in contact with a person's body during use. The portable electronic communication device comprises a controller 14 configured to control both autonomous and external and internal operation of the portable electronic communication device 10, 20, 30 and the BCC wireless communication and the short-range wireless RF communication from and to the portable electronic communication device 10, 20, 30. The portable electronic communication device 10, 20, 30 comprises a wearable electronic communication device 100 according to the above and below aspects of the invention. The controller 14 is operationally connected to the inventive wearable electronic communication device 100.

The portable electronic communication device 10, 20, 30 according to any aspect of the invention may be a headphone, headset, wristlet, necklace, ring on a finger, ankle band, visors or goggles or a combination of such wearables.

Hence, the antenna 13, 21, 31 of the inventive device 100, i.e. hardware assembly, of the first device 10 is operationally coupled to a circuitry 16 comprising both BCC and matching circuitry 16B and capacitance measurement circuitry 16A. The measurement of capacitance values by means of the capacitance measurement circuitry 16A of the inventive hardware assembly device 100 are utilized to determine if the first wearable device 10, such as headset or visors, is located on the user's head, arm, hand, finger or wrist or not, before establishing and executing a wireless data transfer between the first inventive wearable device 10 and at least one other portable electronic communication device 20, 30. To sum up, the common antenna or electrode 13, 21, 31 of the inventive hardware assembly device 100 of the inventive first wearable device 10 operates both as the BCC antenna and the capacitance sensor or electrode. Hence, only one physical antenna/electrode 13 is required to be used for two functions. Hence, both the BCC and the capacitance measurement is able to perform by using only one common physical electrode 13 in the hardware device 100 of the inventive first wearable device 10.

The antenna 13 of the hardware device 100 in the first wearable device 10 does not have to be in contact with the skin of the body of the user for enabling the operation and measurement of capacitance in its close surrounding. The capacitance measurement circuitry 16A operatively connected to the common electrode and antenna 13 is tuned in for each hardware assembly device 100 and first wearable device 10 as the associated capacitance measurement functionality depends on the size and the location of the common electrode and antenna 13 in the hardware assembly device 100 and the wearable device 10. Hence, the tuning may be done so that a distance between the antenna 13 and the body and/or head and/or ankle and/or arm and/or finger of the user may range from about 2 mm to 2 cm.

Body-Coupled Communications (BCC), also referred to as Body-Based Communication (BBC) or Near-Body Communication (NBC), has been proposed as a promising alternative to radio frequency (RF) communication as a basis for Body/Personal Area Network (BAN/PAN) communication. BCC allows for an exchange of information between a plurality of devices which are in contact with or in close proximity of a living body. This can be achieved by the transmitting common electrode and BCC-/BAN-antenna 13 that provides a capacitive or galvanic coupling of low-energy electrical fields onto the body surface, i.e. leakage currents with a small magnitude is set to spread out over the human body. The small currents are then detected by a receiver BCC-/BAN-antenna 13A, e.g. another BCC antenna located on the same body (not shown). This receiver BCC-/BAN-antenna 13A may also be another BCC antenna located on another device 20, 30 on and/or close to the same body. This receiver antenna 13A is an optional second antenna and electrode and may be operationally connected to the BCC circuit 16B but does not necessarily have to be operationally connected to the capacitive measurement circuit 16A and does not necessarily have to work in the same way as the inventive common electrode/antenna 13 (see FIG. 6C). However, this receiver antenna 13A may work in the same way as the inventive first common antenna and electrode 13 and be connected to both the BCC circuit 16B and the capacitive circuit 16A (see FIG. 6D). This receiver antenna 13A is an optional second antenna, but could also be a common electrode and antenna in the same way as the inventive common first antenna and electrode 13 in the first inventive hardware device 100 of the first wearable device 10 (see FIG. 6D), even though this is not a requisite. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-/BAN-antennas is very low, i.e. negligible, which means that the BCC antennas can be turned on the entire time.

BCC/BBC is no new technique, and it has previously been employed within the fields of e.g. medical sensor devices and exercise sensors. Within these fields, sensors attached to the users skin or worn in the close proximity of the body is employed for monitoring different body functions in order to keep track of medical status or fitness parameters of the user. To send the collected data to a central unit e.g. BCC/BBC can be utilized.

The wearable and portable electronic communication device 1, 10 may comprise at least one hardware assembly device 100, which in turn comprises at least one combined capacitance sensor or electrode or antenna 13, 21, 31 and/or additional/optional sensors/electrodes 13A adapted for both measuring capacitance to detect if the device 1, 10 is close to or on a user's body or not and to perform BCC, see FIGS. 1 to 6D. The first wearable and portable electronic communication device 1 may also comprise a wireless communication interface and circuitry 15 configured for handling radio signals sent via air. The inventive communication device 1, 10 and hardware assembly device 100 comprises a communication interface and circuitry 16, 16A, 16B for both BCC and capacitance measurement.

The inventive antenna 13, 21, 31 in the hardware assembly device 100 is capable of sending and sensing signals conveyed over the body of a user of the headset 10 instead of through the air by means of capacitive or galvanic coupling of low-energy electrical fields onto the body surface of the user. Such BCC is an alternative or complement to RF communication, e.g. short-range wireless communication between mobile electronic communication devices. The wearable and portable electronic communication device 10 may optionally comprise at least one further combined capacitance sensor or antenna 13A adapted for both measuring capacitance to detect if the device 10 is close to or on a user's body or not and to perform BCC, see FIG. 6D, forming an inventive hardware assembly device 100 with two or more common sensors or electrodes or antennas 13, 13A, 21, 31.

The first wearable and portable electronic communication device 1 in the form of a headphone/-set or visors 10 also comprises necessary components and circuitry, e.g. controllers, transmitters, memories, interfaces, power supplies, and antennas and so on, to enable the wireless RF communication circuitry 15 to perform, as sender and receiver, short-range wireless communication through the air instead of using the "body wiring", i.e. BCC, e.g. by using RF suitable for air transmission, e.g. Bluetooth™ (BT), with at least one other wearable and portable electronic device 20, 30. The first, second and any third wearable and portable electronic communication device 1, 10, 20, 30 may also comprise necessary components and circuitry for short range wireless communication referred to as Near Field Communication (NFC). The use of and required equipment and components 15 and 18 for enabling RF, BT and NFC communication in the first, second and third mobile electronic communication devices 1, 10, 20, 30 will not be explained in detail below as this is common knowledge for the skilled person.

FIG. 5 shows a schematic overview of an example of another wearable electronic communication device 30. In this example, the third wearable device 30 is a wrist band, sometimes also referred to as a wristlet, but could also be a bracelet, chest band, earring, ring on a finger, ankle band or necklace, intended for a user to wear around the wrist of the arm or ankle of the leg or the neck. The third device 30 may comprise at least one hardware assembly device 100 with at least one inventive common/combined antenna and sensor 13, 13A, 31; at least one controller unit 32; communication means 33, 37, e.g. suitable for short-range wireless communication through the air instead of using the "body wiring", e.g. by using RF suitable for air transmission, e.g. Bluetooth™ (BT); at least one microphone 34 similar to the headset 10 above; at least one memory 35; and, optionally, at least one display 36. In one example, as shown in FIG. 5, the microphone is placed in the wearable device 30, thus it is an internal microphone. In another example, the microphone is placed outside the wearable device (not shown), thus it is an external microphone. The sensor/antenna 31 is capable of sending and sensing signals of BCC in a similar way as the antenna 13 of the hardware assembly device 100 in the first communication device 1, e.g. the headset/visors 10.

Figure 3:
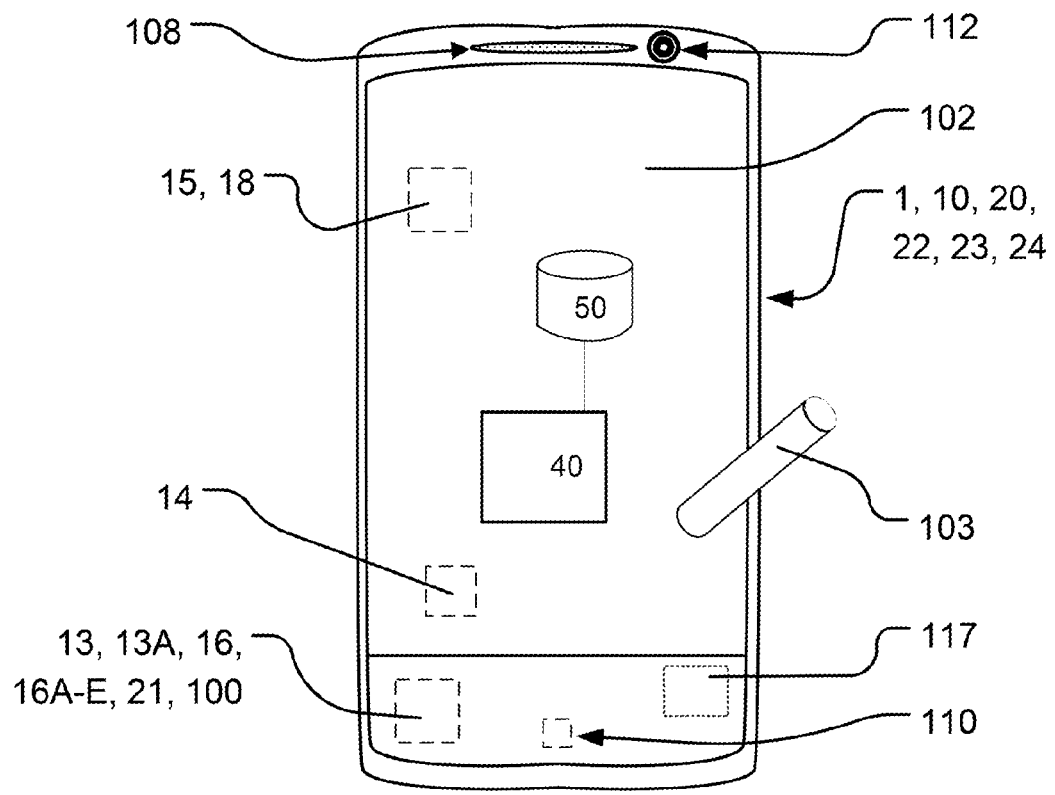
FIG. 3 illustrates an example of a wearable/portable mobile electronic communication device embodying a first implementation of the invention.
Figure 4:
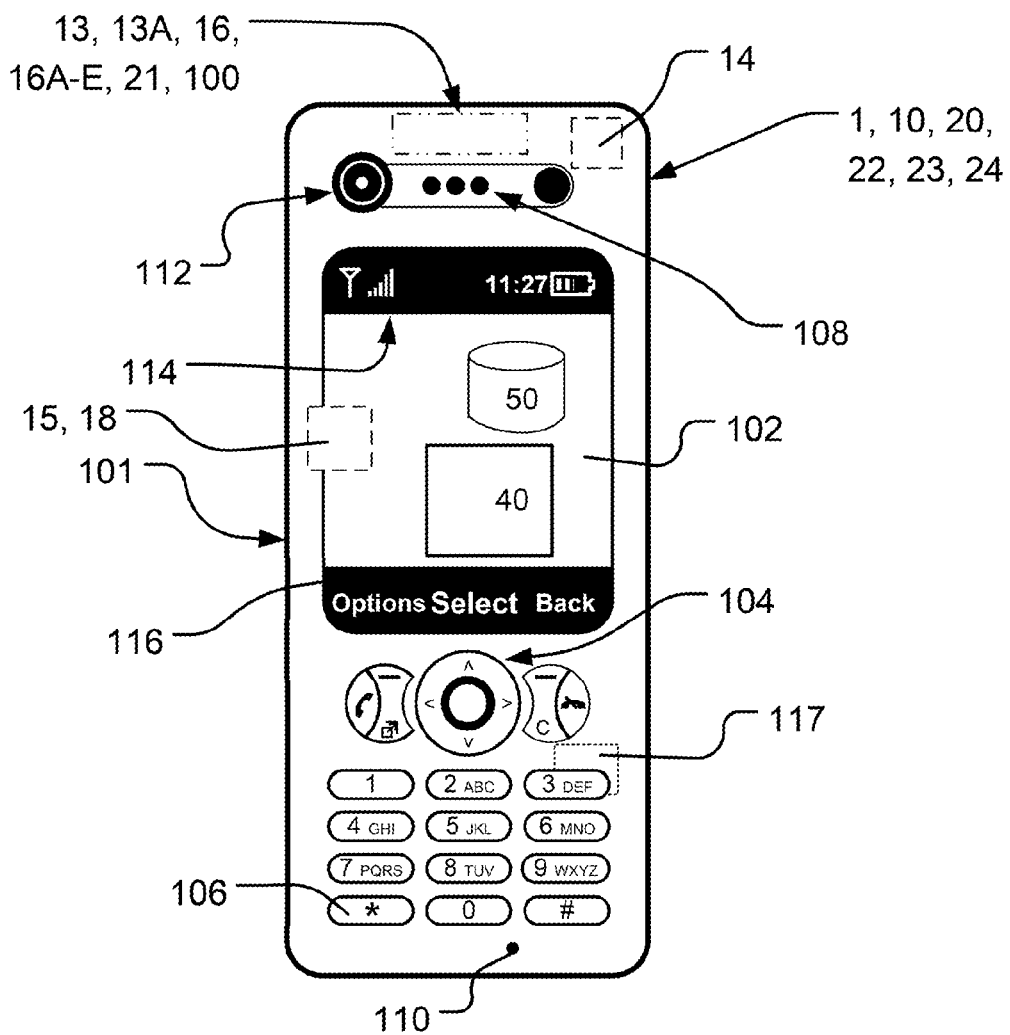
FIG. 4 illustrates another example of a wearable/portable mobile electronic communication device embodying a second implementation of the invention.

In FIGS. 3 and 4, a portable electronic communication device 1, 20 in the form of a mobile phone or a tablet is shown, according to embodiments of the present invention, comprising a casing 101, a display area 102 and means 104 for navigating among items (not shown) displayed in the display area. The display area 102 may comprise a status indication area 114 and one or more soft key bars 116. The status indication area 114 may for example include symbols for indicating battery status, reception quality, speaker on/off, present mode, time and date, etc. The status indication section is not in any way limited to include the symbols and the functions presented herein. The soft key bar 116 is operable using the navigation means 104, as disclosed in FIG. 4, or, if using a touch sensitive screen, e.g. a capacitive display, as disclosed in FIG. 3, by tapping a soft key icon directly with a pen-like object 103, a finger, or other body part. The functions of the soft keys are not limited by the functions indicated in the figure. Neither are the placements of the soft key bar 116 and the status indication area 114 limited to be placed at the bottom and the top of the screen, as shown in the example. The navigation means 104 can be a set of buttons, a rotating input, a joystick, a touch pad, a multidirectional button, but can also be implemented using a touch sensitive display 102 as shown in FIGS. 3 and 4, wherein the displayed items directly can be tapped by a user for selection, or be voice activated via a headset or a built-in microphone. The mobile communication device 1 can also comprise other elements normally present in such a device, such as a keypad 106, a speaker 108, a microphone 110, a camera 112, a processor 40, a memory 50, one or more accelerometers (not shown), a vibration device (not shown), an AM/FM radio transmitter and receiver (not shown), a digital audio broadcast transmitter and receiver (not shown), a card reader 117 for smart cards, e.g. SIM and/or memory cards, etc. Each of the portable electronic devices 1, 20, 30 also comprises power supplies, such as at least one battery (not shown) for its operation.

The portable electronic communication device 1 may be any portable electronic device such as, e.g. a headphone 10, a headset 10, visors 10, goggles 10 with or without a display 19, 19A, 19B or any suitable picture or movie projector. The portable and wearable electronic communication device 1, 10, 20, 30 and the hardware assembly device 100 is configured to be in close proximity to and/or in contact with the same body of a user for ensuring the functionality of BCC communication and associated BCC signals transmitted and received by itself and between itself and any other portable electronic communication device on the same body. Any head, ankle, arm, hand, wrist worn portable device 1, 10, 20, 30 may be equipped with one or more displays 19, 19A, 19B and/or one or more speakers 11, 12, 108.

A second portable electronic communication device 1 may be any portable electronic device such as, e.g. a mobile radio terminal 20, a mobile telephone 20, a cellular telephone 20, a pager, a communicator, a smart phone 20, a Personal Digital Assistant (PDA) 20, an electronic organizer, a computer, a digital audio player such as a MP3-player or an iPod®, a tablet or media plate (e.g. iPad®) 20, a digital camera, or any suitable picture or movie projector being in close proximity to and/or in contact with the same body of a user as the wearable 10 for ensuring the functionality of the BCC communication and the associated BCC signals according to the invention between the two devices 20 and 10 and the hardware assembly device 100.

The user may also wear the third portable electronic device 1 being any portable electronic device such as, e.g. a wristlet 30, a bracelet 30, a watchstrap/-band 30, chest band 30, wristwatch 30, necklace 30 with or without a display 36, a speaker 11, 12, 108 or any suitable picture or movie projector being in close proximity to and/or in contact with the same body of a user as the head wearable 10 and/or the second portable electronic communication device 20 for ensuring the functionality of the BCC communication between the three or more devices 10, 20 and 30. Preferably, the second and/or third portable electronic communication device 20, 30 should be in close proximity to and/or in contact with the same body of a user as the wearable device 10 and the hardware assembly device 100 for ensuring the functionality of the BCC communication.

The first portable electronic communication device 10 comprises a memory/database (not shown) comprising at least the predefined capacitance values being checked via the combined and common BCC antenna and capacitance sensor 13, 21, 31 of the inventive first portable electronic communication device 10. The first portable communication device 10 may comprise a comparator (not shown) adapted for comparing the constantly measured capacitance via the combined BCC antenna and sensor 13, 21, 31 of the hardware assembly device 100 in the first portable communication device with the predefined capacitance being stored in the database/memory (not shown).

The second portable electronic communication device 20 may comprise a controller 14 and the antenna 21. The third portable electronic communication device 30 may comprise a controller 14 and the antenna 31. The antennas 21 and 31 may be configured for BCC similar to the antenna 13, 13A of the inventive hardware assembly device 100 in the first portable electronic communication device 10 except for the capacitance measuring capability by means of the combined BCC antenna and capacitance sensor 13. However, one or more of the devices 1, 20, 30 may also comprise one or more of the hardware assembly devices 100 with one or more of the combined capacitance sensor and BCC antenna 13 of the first device 10 applied in the form of their antennas 21, 31. The devices 20, 30 may also comprise one or more of the hardware assembly devices 100 with one or more of the combined capacitance sensor and BCC antenna 13 of the first device 10 applied in the form of their antennas 21, 31 and one or more of optional sensors/antennas 13A with the same abilities and functions as the common capacitance sensor and BCC antenna 13 of the first device 10. The devices 20, 30 may also comprise one or more of the hardware assembly devices 100 with one or more of the combined capacitance sensor and BCC antenna 13 of the first device 10 applied in the form of their antennas 21, 31 and one or more of optional sensors/antennas 13A not having the same abilities as the common capacitance sensor and BCC antenna 13 of the first device 10. The second portable electronic communication device 20 may comprise a communication interface 22 for short-range wireless communication, e.g. via BT, with the first and/or the third portable electronic communication device 10, 30. The second portable electronic communication device 1, 20 may comprise a communication interface 23 for BCC with the first and/or the third portable electronic communication device 10, 30.

The first portable electronic communication device 10 comprises communication interface 15 for short-range wireless communication, e.g. via BT, with the second and/or third portable electronic communication device 20, 30. The portable electronic communication device 10 may comprise one or more communication interfaces in the form of one or more inventive hardware assembly devices 100 comprising processing circuitries 16, 16A, 16B, 16C, 16D, 16E for measuring/detecting capacitance autonomously via circuits 16, 16A, 16E and/or control and perform BCC via circuits 16, 16B, 16C, 16D and short-range wireless RF communication via associated circuitries 15, 18 with the external second and/or third portable electronic communication device 20, 30.

The third portable communication device 30 may comprise a communication interface 33 for short-range wireless communication, e.g. via BT, with the second and/or first communication device 10, 20. The third communication device 30 may comprise a communication interface 37 for BCC with the second and/or first communication device 10, 20. The second portable communication device 20 may comprise a control unit with associated processing circuitry 24 for control of the communication of the second device 1, 20. The third device 30 may comprise a control unit with associated processing circuitry 32 for control of the communication of this third wearable device 30.

Hence, to sum up and clarify the aim, the function and all the aspects of the invention, the following explanation is done: The second processing circuitry 16B for the BCC circuit comprises traditional radio transmitter 150 and receiver 160 in order to transfer digital data-messages by means of for example frequency shift keying (FSK) modulation. The matching circuit 16C (of the second processing circuitry 16B, i.e. the BCC circuit 16B) working at 5-50 Mega Hertz (MHz) comprises passive reactive components, such as inductors and capacitors of for example 330 nano Henry and 39 pico Farad, respectively, tuned to resonate at the carrier frequency desired and under the condition of a human body touching the electrodes 13, 13A, 21, 31. An important role of this matching circuit 16C is to ensure an as good power transfer between the BCC circuit 16B and the human body as possible and this is accomplished by its ability to transfer the impedance seen between the electrodes 13, 13A, 21, 31 or between electrode 13, 13A and the ground-plane of the circuit 16B to the input/output impedance of the circuit 16B. The BCC circuit 16B however has both the transmitter 150 and the receiver 160 with different optimum input and output impedances, respectively. The matching circuit 16C is therefore designed in such a way that the human body touched electrode impedance can be tuned to satisfy both the receiver and transmitter desired impedances simultaneously of the BCC circuit 16B. This is inventive and is a matter of if one wants to sacrifice transmitter or receiver performance. The high pass filter 120 inserted between the electrode 13, 21, 31 and the BCC matching circuit 16C will block the low frequency signals coming from the capacitive sensor circuit 16A. Hence, electrode impedance when on the body is matched to BCC circuit 16B optimum (low) impedance and simultaneously high pass filter 120 is blocking the low frequency signal from the capacitive sensor circuit 16A.

The first processing circuit 16A for the capacitance measurement may have a built-in oscillator. This oscillator operates at between 1-100 kilo Hertz (kHz) i.e. at a much lower frequency than the BCC circuit 16B. The oscillator is part of the measurement assembly configured to detect any reflected oscillator signal from its common antenna and electrode 13, 21, 31 when touched by a human or by means of detecting an impedance imbalance in a Wheatstone bridge type of arrangement. The capacitive sensor circuit 16A has a built-in automatic calibration function such that when the common antenna and electrode 13, 21, 31 is not touched the output signal of the common antenna and electrode 13, 21, 31 is zero. This sensor-circuits input impedance or its electrode interface impedance is somewhat higher than what is the case for the BCC electrode interface and can also accept an external resistor 130, 140, e.g. at 1-10 kΩ, to be connected in series with the circuit electrode input terminal of capacitive sensor circuit 16A without affecting the sensitivity. This helps improving the isolation between the two functions of BCC and capacitive measurement and hence as a consequence thereof a common electrode 13, 21, 31 can be used for both BCC and the capacitive sensor. To sum up, the capacitive sensor circuit 16A is operating at a higher impedance level than the BCC circuit 16B and at a lower signal frequency which imposes a minimum loading impact to the BCC circuit 16B.

To sum up, this invention is about utilizing one common electrode 13, 21, 31 for two functions of a mobile phone accessory 10, 20, 30, a wearable device such as a smart-band etc. Very little surface area is offered on such portable devices 10, 20, 30, which justifies the present idea. The solution to be able to use a common electrode 13, 21, 31 is to ensure that each circuit 16A and 16B is made invisible to each other both in terms of power loss and interfering noise. Therefore maximum isolation is accomplished if most of the BCC power at both receive and transmit modes can be directed to the BCC-circuit 16B instead of leaking off to the capacitive sensor circuit 16A and this is obtained by means of ensuring the capacitive sensor circuit 16A to present a higher impedance than what is optimum for the BCC circuit 16B and hence the external series resistor 130 or low pass filter 140. Furthermore, the BCC circuit 16B is a very sensitive circuit and therefore any noise at its input needs to be minimized and hence the band-pass filter 120 (or a high pass filter 120) at the BCC input is there to filter out the capacitive sensor signal from reaching the receiver of the BCC circuit 16B.

The resistor 130 and/or the low pass filter 140 and/or the band-/high pass filter 120 are important components for the function of the invention. The resistor 130 or low pass filter 140 might be the more important. Specifically: for the first processing BCC circuit 16B, the band-pass or high pass filter 120 together with the matching circuit 16C must transfer the electrode impedance to the desired impedance of the BCC circuit 16B with minimum power loss and simultaneously block the signal from the capacitive sensor 13, 21, 31.

For the capacitive measuring circuit 16A: the resistor 130 or low pass filter 140 adds isolation as the capacitive sensor 13, 13A, 21, 31 already has a high impedance itself; key is that circuit 16A has a higher impedance than BCC circuit 16B and this can be accomplished by means of the low pass filter (LP) 140 instead of the resistor 130 or vice versa or in combination. This LP-filter is configured to offer high impedance at the BCC carrier frequency. Some LP-filters offers by default low impedance at higher frequencies.

The system's primary function may be controlled by the first communication device 10 for wearing on a user's head by means of its controller 14 and its associated hardware assembly device 100 comprising the processing circuitry 16, 16A, 16B and combined antenna and capacitance sensor 13, which may initiate and perform, by itself, i.e. autonomously, at least the following actions: i.e. checking, by means of the hardware assembly device 100 itself, if a capacitance belongs to a predefined capacitance interval or range indicating that the first communication device 10 is in close proximity to the head or other body part of the user or even in contact with the user's body. The controller 14 of the communication device 10 is triggered to initiate BCC or not by the hardware assembly device 100 itself via its combined antenna and capacitance sensor 13 with the second and/or third device 20, 30 in response to the checked capacitance. The controller 14 sends, via the common and combined BCC antenna and capacitance sensor 13 of the inventive/first hardware assembly device 100 and first portable communication device 10 itself, a BCC signal over the user's body in response to the checked capacitance comprising short-range wireless communication pairing information to the second and/or third device 20, 30 if a wireless RF/BT communication is to be performed. The controller 14 of the wearable device 10 may then be triggered to prepare/set up a short-range RF wireless communication by itself with the second and/or third device 20, 30 by means of the circuitry 15, 18. Then, if at least one of the second or third devices is in close proximity to the body of the same user or in contact with body of the user, the main device 10 may receive short-range wireless communication signals sent from the secondary and/or third device 20, 30. The main communication device 10 itself or the secondary and/or third device 20, 30 may execute the short-range wireless RF communication between the first communication device 10 and the second and/or the third device 20, 30.

The controller 14 with associated processing circuitry 16, 16A, 16B of the hardware assembly device 100 is configured for detecting/measuring if a capacitance belongs to a pre-defined capacitance interval or range indicating that the portable communication device 10 is in close proximity to the head or other body part of the user or even in contact with the user's body or not and configured for control of the BCC and the short-range wireless RF communication with the second and/or the third communication device 20, 30. This may be done by causing the first communication device 10 to initiate and perform execution of predefined actions comprising: for example, continuously checking capacitance by means of one processing circuitry 16, 16A in operational connection with the hardware assembly device 100 and its combined BCC antenna and capacitance sensor 13. This means that the first device 10 in fact has its own controller 14 making this body, head, arm and/or leg wearable communication device 10 able to operate autonomously, i.e. this first device 10 may in itself check if it is put on a user's body or not and if it is supposed to wake-up and start initiation and establishment and operation of a BAN with at least one other portable communication device 20, 30 without the user actively and manually setting up the BAN network. This is done by checking, if a capacitance belongs to a predefined capacitance interval/range indicating that the inventive first communication device 10 is in close proximity to the body and/or head and/or arm and/or leg of the user, or even in contact with the body and/or head and/or arm and/or leg of the user by means of the processing circuitry 16, 16B and its associated components.

The controller 14 of the wearable device 10 may be triggered to initiate BCC by itself via the hardware assembly device 100 and its common capacitance sensor and BCC antenna 13 with the second and/or third device 20, 30 in response to the checked capacitance. By means of the controller 14 via the hardware assembly device 100 and combined capacitance sensor and BCC antenna 13 of the first device 10 itself, at least one BCC signal is sent over the user's body in response to the checked capacitance comprising for example pairing information to be able to establish a short-range wireless RF communication with the second and/or the third device 20, 30. The controller 14 may be triggered to prepare a short-range wireless communication, e.g. via BT, by itself with the second and/or the third device 20, 30. The short-range wireless communication between the first and the second and/or the third device 10, 20, 30 may be executed if also this second and/or third device is in close proximity to the body and/or head of the same user, or even in contact with the body and/or head and/or arm/wrist of the same user.

The controller 14 and the hardware assembly device 100 and its processing circuitry 16A of the portable communication device 10 may be configured to measure capacitance by means of its common/combined capacitance sensor and BCC antenna 13.

The controller 14 of the portable communication device 10 may be configured to compare the measured capacitance of the hardware assembly device 100 and its combined capacitance sensor and BCC antenna 13 with capacitance data stored in the portable communication device 10 itself. This storage of capacitance data may be done in the memory/database 50 of this first device 10. The controller 14 of the portable communication device 10 may be configured to determine, by itself, if the measured capacitance of its hardware assembly device 100 with the combined capacitance sensor and BCC antenna 13 belongs to a predefined capacitance range/interval indicating that the communication device 10 is in close proximity to the body of the user and/or head of the user, or even in contact with the body and/or head of the user. The controller 14 of the first portable communication device 10 may be configured to check, if the checked capacitance belongs to a predefined capacitance interval/range indicating that the first device 10 is in close proximity to or in contact with the body of the user, or to maintain the current operation mode and not initiate and perform/execute BCC and/or short-range wireless RF communication or to end ongoing BCC and/or short-range wireless RF communication, if the checked capacitance do not belong to a predefined capacitance interval/range indicating that this inventive first device 10 is not in close proximity to or in contact with the body of the user.

Moreover, i.e. if it is confirmed that the capacitance checked by the device 10 and its controller 14 and hardware assembly device 100 and its processing circuitry 16, 16A, 16B belongs to a predefined capacitance interval/range indicating that the first device 10 is in close proximity to or in contact with the body of the user, steps of initiating and performing BCC and/or short-range wireless RF communication is performed thereafter. Accordingly, also unpairing of devices 10, 20, 30 is performed if appropriate.

The antenna 13 and the capacitance sensor/electrode 13 are one and the same entity. The antenna 13 and the capacitance sensor/electrode 13 may be one and the same physical component. The antenna 13 and the capacitance sensor/electrode 13 may be one and the same hardware. The antenna 13 and the capacitance sensor/electrode 13 may be one and the same electrode. The antenna 13 and the capacitance sensor/electrode 13 may be one and the same antenna.

The invention claimed is:

1. A wearable electronic communication device for a portable electronic communication device, the wearable device is configured for Body Coupled Communication (BCC) and capacitance measurement in close proximity to a person's body and comprises:
    a BCC antenna over which BCC is carried out and that functions as a capacitance sensor that makes a body capacitance measurement, wherein if the body capacitance measurement belongs to a predefined capacitance range, the body capacitance measurement indicates that the wearable device is in close proximity to or in contact with a body part of the person, and
    processing circuitry in operational connection with the BCC antenna, the processing circuitry controlling the BCC and the body capacitance measurement, wherein the antenna and the capacitance sensor are the same structural entity arranged as one common electrode for both the BCC and the body capacitance measurement of the wearable device, the processing circuitry comprising a first impedance used when the common electrode is used for body capacitance measurement and a second impedance used when the common electrode is used for BCC.

2. A wearable electronic communication device according to claim 1, wherein the processing circuitry of the wearable device comprises first and second processing circuitry operationally coupled to the common electrode and respectively presenting the first and second impedances, the first processing circuitry is configured to perform/control the body capacitance measurement and to present a higher impedance than the impedance of the second processing circuitry configured to perform/control the BCC.

3. A wearable electronic communication device according to claim 2, wherein the second processing circuitry comprises a band-pass filter operationally arranged as an input of the second processing circuitry to filter out any interfering noise originating from signals of the common antenna and capacitance sensor as a result of the capacitance measurement.

4. A wearable electronic communication device according to claim 2, wherein the second processing circuitry comprises a high-pass filter operationally arranged as an input of the second processing circuitry to filter out any interfering noise originating from signals of the common antenna and capacitance sensor as a result of the capacitance measurement.

5. A wearable electronic communication device according to claim 2, wherein the first processing circuitry comprises a resistor operationally arranged as an input of the first processing circuitry to increase the impedance of the first processing circuitry.

6. A wearable electronic communication device according to claim 2, wherein the first processing circuitry comprises a low-pass filter operationally arranged as an input of this first processing circuitry to increase the impedance of the first processing circuitry.

7. A wearable electronic communication device according to claim 1, wherein the processing circuitry comprises sub-circuitry operationally adapted to tune the impedance of the processing circuitry resulting from when the common antenna and capacitance sensor is in close proximity to or in contact with the body of the person or not to match both the receiving and transmitting impedances of the processing circuitry simultaneously.

8. A wearable electronic communication device according to claim 1, wherein the processing circuitry comprises sub-circuitry operationally adapted to control/perform BCC via the common antenna and capacitance sensor when the common antenna and capacitance sensor is in close proximity to or in contact with the body of the person, the sub-circuitry comprising a transmitter and a receiver.

9. A portable electronic communication device configured as a wearable electronic communication device according to claim 1 and configured to carry out Body Coupled Communication (BCC) and short-range wireless RF communication when in close proximity to or in contact with a person's body, further comprising:
    a controller configured to control autonomous and external and internal operation of the portable electronic communication device and the BCC wireless communication and the short-range wireless RF communication from and to the portable electronic communication device.

10. A portable electronic communication device according to claim 9, wherein the portable electronic communication device is at least one of a headphone, headset, wristlet, necklace, ring, ankle band, visors or goggles.

\* \* \* \* \*